United States Patent Office 3,038,880
Patented June 12, 1962

---

3,038,880
BLOCK COPOLYMERS OF POLYCARBONATES FROM 2-PHENYL-BISPHENOL A AND 4,4'-BIS-(HYDROXYPHENYL) - METHYL- DIHALOPHEN-YLMETHANES AND THE LATTER COMPOUNDS PER SE
Thomas M. Laakso and Michael C. Petropoulos, Rochester, N.Y., assignors to Eastman Kodak Company, Rochester, N.Y., a corporation of New Jersey
No Drawing. Filed July 17, 1959, Ser. No. 827,708
3 Claims. (Cl. 260—47)

This invention relates to improved polycarbonates essentially composed of alternating blocks having structures composed of (I) recurring units from 4,4'-bis(hydroxyphenyl)methylphenylmethane which can be called 2-phenyl-bisphenol A and (II) recurring units from certain 4,4' - bis(hydroxyphenyl) - methyl-dihalophenylmethanes wherein from about 60 to 85 mole percent of the recurring units are derived from 4,4'-bis(hydroxyphenyl) methylphenylmethane. The halogen atoms can be fluoro or chloro or both. This invention also relates to new compounds composed of said 4,4'-bis(hydroxyphenyl)-methyl-dihalophenylmethanes and a method for their preparation. This invention also relates to a process for preparing the block copolymers. These block polymers are characterized by having high heat softening temperatures, a high Young's modulus of elasticity and a high degree of flexibility. Useful photographic elements are also included in this invention wherein a film of the improved polycarbonate supports a coating of light-sensitive emulsion.

The preparation of polycarbonates of the general class with which this invention is concerned is well known in the art. A number of patents have been issued in the last few years describing polycarbonates prepared from bisphenol A and from various derivatives of bisphenol A. Among the prior art are various articles in the literature concerning this subject including an article by Schnell as to polycarbonates as a new group of plastics and the preparation and properties of aromatic polyesters of carbonic acid, Angewandte Chemie, 68: 633–660, No. 20, October 21, 1956.

An object of this invention is to provide an especially valuable improved polycarbonate predominantly derived from 4,4'-bis(hydroxyphenyl)methylphenylmethane which has quite unusual properties which were unexpected in view of the prior art.

A further object of this invention is to provide a process for preparing such improved polycarbonates which are characterized by a block structure.

Another object of this invention is to provide new and useful compounds comprising 4,4'-bis(hydroxyphenyl)-methyl-dihalophenylmethanes which are useful in preparing improved polycarbonate block copolymers.

A further object of this invention is to provide photographic elements comprising a film support prepared from the improved polycarbonates provided by this invention and coated with a light-sensitive silver halide photographic emulsion.

Other objects will become apparent elsewhere herein.

According to a preferred embodiment of this invention there is provided an improved polycarbonate of 4,4'-bis (hydroxyphenyl)methylphenylmethane consisting of a highly polymeric block copolymer having an inherent viscosity of from about 0.4 to about 3.5 essentially composed of alternating blocks having the structures:

(I) Blocks composed of from about 3 to about 50 recurring units having the following Formula A—

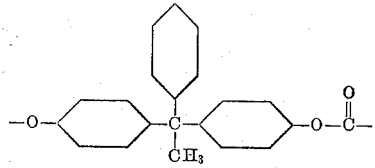

and (II) Blocks composed of about 3 to about 50 recurring units having the following Formula B—

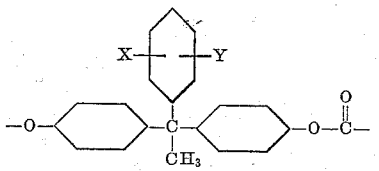

wherein each of X and Y represents a halogen atom selected from the group consisting of chlorine and fluorine atoms and wherein from about 60 to 85 mole percent of said block copolymer is composed of said units having Formula A, said block copolymer being characterized by having a heat softening temperature at least 10° higher than for the homopolymer of either of units of Formula A or of units of Formula B and in the range of from about 200°–230° C., having a Young's modulus of elasticity for film which is at least about 20% greater than for the homopolycarbonate of bisphenol A and at least about 28,000 kg./sq. cm. and having a flexibility measured by the MIT folds test at least about 3 times greater than for a homopolymer of units of Formula B and at least about 35.

Thus, an embodiment of this invention provides a highly useful series of high molecular weight block unit polymers having two different prepolymer blocks of units of a linear polycarbonate of 4,4'-bis(hydroxyphenyl) methylphenylmethane and a linear polycarbonate of a 4,4' - bis(hydroxyphenyl) - methyl-dihalophenylmethane. This series of block copolymers possesses to a surprisingly satisfactory degree the valuable properties of all of the blocks present in the polymer and is actually superior as regards heat distortion characteristics. This is considered an unobvious discovery for various reasons including the fact that neither of the individual high molecular weight homopolymers possess all of the properties achieved in accordance with this invention. The series of block copolymers encompassed by this invention have a most unexpectedly high Young's modulus of elasticity, a high degree of flexibility as measured by the MIT folds test and surprisingly high heat distortion temperatures, all of which are important characteristics of any film to be used as a support for a photographic element.

The article mentioned above written by Schnell explains that the broad concept of such polycarbonates as are contemplated by this invention was known prior to the discoveries disclosed herein. Work in various places based upon the activities of workers in this art during the past half century has recently resulted in a preparation of commercial polycarbonate films derived from bisphenol A which is more specifically known as 2,2-bis(4-hydroxyphenol)propane. It appears that such bisphenol A polycarbonates are not only being commercially used for many of the purposes for which films in general are useful but that they are also being contemplated for certain rather severely limited utility as a photographic film support. Thus, the use of polycarbonates from bisphenol A as a photographic base is very seriously limited by the fact that the Young's modulus of elasticity is only somewhere on the order of about 23,000 kg./sq. cm. This compares quite unfavorably with other commercially available film bases such as cellulose triacetate where the Young's modulus lies in the range of 30,000–40,000. Another film base useful for photographic purposes is oriented polystyrene which has a Young's modulus somewhere on the order of about 35,000 kg./sq. cm. or perhaps a little less.

It is obvious that for a photographic film base to be a significant improvement over the prior art it should have some properties which render it substantially superior to cellulose triacetate which is generally recognized as the most commonly used satisfactory film base for photographic purposes. The tremendous number of characteristics and properties of photographic film bases is well known in the art relating to photography. The work in recent years in this art has tended toward the development of new base materials such as the general class of polyesters including polycarbonates, polyvinyl derivatives such as polystyrene, etc. A polyester such as polyethylene terephthalate is useful as a film base but cannot be solvent cast by the practicable techniques so carefully and thoroughly developed during the last few decades with regard to cellulose esters as film bases. Although polyvinyl derivatives such as polystyrene can be solvent cast, a film base prepared from polystyrene (even though it has been oriented) has a heat softening temperature on the order of only about 100° C. and therefore has rather limited utility. In contrast, a film base derived from cellulose triacetate has a heat softening temperature on the order of about 155° C.

The photographic film bases which can be solvent cast and which have been described in the prior art as of commercial value such as cellulose triacetate and polystyrene are considered to have flexibilities which are merely on the edge of being satisfactorily acceptable. Thus, cellulose triacetate has a flexibility as measured by the MIT folds test of about 25–35 folds. Polystyrene is somewhat better when oriented and has an average flexibility of about 50.

With the development of polycarbonate films such as can be derived from bisphenol A it became obvious that they had promise with regard to their use as photographic film bases provided that the Young's modulus of elasticity could be improved upon. One polycarbonate mentioned by Schnell and by others which appeared to have some promise was that derived from 4,4'-bis(hydroxyphenyl)methylphenylmethane since this polycarbonate as a film has a Young's modulus of elasticity of about 29,000 kg./sq. cm. This value is not substantially much less than the lowest values ordinarily measured for cellulose triacetate film bases. However, the flexibility of well cured films of a homopolymer thereof was found to be less than for cellulose esters and therefore on the borderline of being satisfactory for commercial applications as a photographic film base.

One possibility for improving the properties which was considered by the inventors was the preparation of random copolymers with bisphenol A with a view toward obtaining a copolymer which might have improved flexibility and a reasonably high heat softening temperature along with all of the other properties necessary for satisfactory utility as a photographic film support. However, it was found that no results could be predicted with any satisfactory degree of certainty and the highly empirical nature of these investigations became more apparent as work progressed.

An especially valuable discovery pertaining to the present invention is the fact that block copolymers can be prepared which have higher heat softening or heat distortion temperatures than either of the homopolymers.

It was also quite surprising to find that these block copolymers had flexibility values measured by the MIT folds test of at least about 3 times greater than for the homopolymers of modifying chlorinated bisphenols and at least about 35, which is substantially as good or better than cellulose triacetate film bases. This was especially unobvious since some of the component bisphenols in the form of homopolymers have flexibilities on the order of 0–10 MIT folds as shown in the table hereinbelow and others have flexibilities below the normal range of cellulose triacetate. Other tests disclosed that the polycarbonates contemplated by this invention had other properties and characteristics which rendered them quite useful as photographic film supports. Such other properties have been adequately described in the prior art with regard to polycarbonates of this general type.

Perhaps the most outstanding property of the polycarbonate film bases is the retention of the Young's modulus of elasticity at much higher temperatures than in the case of film from cellulose triacetate, polystyrene in oriented form and polyethylene terephthalate in oriented form. Thus, the polycarbonate films produced in accordance with the present invention retain to a substantial degree their high modulus of elasticity at temperatures up to their heat softening temperatures, namely 200°–230° C. In contrast, the retention of Young's modulus for polyethylene terephthalate begins to fall off very rapidly at temperatures of about 100° C. and becomes significantly less than the Young's modulus for the polycarbonates of this invention at temperatures approaching 200° C. This factor also applies to film supports prepared from cellulose esters and polystyrene although the dropoff is not as pronounced as it is for polyethylene terephthalate. As a result, the polyesters of this invention have unusually valuable properties as photographic film supports at temperatures above 150° C.

Thus, according to this invention it has been found that by preparing block copolymers consisting of alternating sequences of certain polycarbonates derived from 2-phenyl-bisphenol A and certain halogenated bisphenols (particularly block copolymers having 75 mole percent of the 2-phenyl-bisphenol A component), there is obtained a significant improvement in the substandard properties without sacrificing to any unacceptable degree the desirable values shown by the homopolymers. These block copolymers show physical properties quite different from the random copolymers prepared by conventional methods. That these block copolymers are not physical mixtures is shown by their different solubility characteristics in organic solvents.

This invention can be further illustrated by the following examples of preferred embodiments although it will be understood that these examples are included merely for purposes of illustration and are not intended to limit the scope of the invention unless otherwise specifically indicated:

EXAMPLE 1

Preparation of block copolycarbonate of 75 mole percent 2-phenyl-bisphenol A—25 mole percent 4,4'-bis(hydroxyphenyl) methyl-3,4-dichlorophenylmethane.

Simultaneous preparation of the two homopolymer blocks was employed (see table of components below). In two separate flasks equipped with a stirrer, a thermometer and a dropping-funnel were placed distilled water, sodium hydroxide and the bisphenol component. A clear solution was obtained and the flask was maintained at about 15° C. or lower by means of an ice bath, then part of the methylene chloride was added with stirring and phosgene dissolved in cold, dry, distilled methylene chloride was added slowly within a period of 15 to 45 minutes, keeping the temperature below about 15° C. The contents in the two flasks were reacted for about the same periods of time so as to obtain low molecular weight polymers of I.V. about 0.1 to 0.2. The contents of the flasks were then combined at once and the catalyst added. The components were as follows:

Component A—
37.4 g. (0.129 mole) 4,4'-bis(hydroxyphenyl)methylphenylmethane otherwise called phenyl bisphenol A
14.4 g. (0.36 mole) sodium hydroxide
14.1 g. (0.142 mole) phosgene in 50 ml. cold, dry distilled methylene chloride
200 ml. distilled water
200 ml. distilled methylene chloride Component B—
15.4 g. (0.043 mole) 4,4'-bis(hydroxyphenyl)methyl-3,4-dichlorophenyl methane
4.8 g. (0.12 mole) sodium hydroxide
4.7 g. (0.047 mole) phosgene in 50 ml. cold, dry distilled methylene chloride
100 ml. distilled water
100 ml. distilled methylene chloride Component C—
1 ml. tri-n-butylamine The above components A and B were run separately and simultaneously, combined, tri-n-butylamine added, and allowed to polymerize. Polymerization time was about 5 minutes. The reaction was acidified with glacial acetic acid and 200 ml. additional methylene chloride was added. After being washed free of water-soluble materials the polymers were precipitated from solution by pouring the viscous dope into several volumes of methyl alcohol.

The yield of white fibrous polymer was 95 percent of the theoretical value, and it had an inherent viscosity of 1.58 in chloroform.

A clear film cast from a methylene chloride solution of this block polycarbonate had the following physical properties:

Young's modulus _____ $2.98 \times 10^4$ kg./cm.$^2$.
Yield and tensile _____ 755 kg./cm.$^2$.
Elongation _____ 7 percent.
Tear _____ 60.
Folds _____ 50.
Heat distortion temp _____ 210° C.

Various runs were prepared as just described using other proportions of reactants and other reactants as covered by the above general Formula B. At the end of the separate runs the I.V. was usually about 0.1–0.2 although values of 0.05 to 0.25 are also contemplated. At the beginning of the combined polymerization reactions the polymer solutions had flow times of just a few seconds as measured from a standard pipette. After a few minutes of continuous stirring, the flow time of the combined reaction mixture had increased to from 50 up to several hundred seconds depending upon the time mixed and the desired I.V. being sought. The polymerization was stopped at this time by acidifying the reaction with glacial acetic acid. The methylene chloride layer was usually diluted with enough methylene chloride to allow more efficient stirring and water washing of the polymer solution free of soluble materials. The polymer was usually precipitated from methylene chloride solution by slowly pouring the viscous dope into methyl alcohol. After leaching in fresh methanol, the polymer was generally dried at 50° C. under reduced pressure.

The yield of white fibrous polymer was usually at least 80% of the theoretical value. These block copolymers had an inherent viscosity of from about 0.4 to about 3.5 as measured in chloroform. The I.V. can also be measured in 1:1 phenol and chlorobenzene solution.

Phyical properties of these block copolymers were in the ranges as already described above. See also the table of data below.

The unmodified 4,4'-bis(hydroxyphenyl)-methyl-halophenyl methane polycarbonate homopolymers can be prepared by preferred procedures as follows:

EXAMPLE 2

*Homopolycarbonate From 4,4'-Bis(Hydroxyphenyl)- Methyl-4-Chlorophenyl Methane*

Twenty-seven and nine-tenths grams (0.086 mole) of 4,4'-bis(hydroxyphenyl)methyl-4-chlorophenyl methane is dissolved in 9.6 g. (0.24 mole) of sodium hydroxide in 350 ml. of distilled water. This solution is cooled to 15° C. and 300 ml. of distilled methylene chloride is added. With good stirring, a solution of 9.4 g. (0.095 mole) of phosgene in 50 ml. of dry distilled methylene chloride is added within a period of 15 minutes, at such a rate that the temperature does not exceed 15° C. After the addition 0.5 ml. of tri-n-butylamine is added. Stirring is continued to a point where the viscosity of the lower methylene chloride layer has reached a flow time of 1 minute 35 seconds through a standard pipette. Enough glacial acetic acid is then added to neutralize the alkali. The methylene chloride solution of the polymer is washed free of salts so that it gives a clear film when coated on a glass plate. The polymer is isolated by carefully precipitating the polymer by pouring the viscous dope into three volumes of methyl alcohol.

The yield of white fibrous polymer was 90 percent of the theoretical value and it had an inherent viscosity of 0.5 in chloroform.

A clear film cast from a methylene chloride solution of this polymer had the following physical properties:

Young's modulus _____ $2.6 \times 10^4$ kg./cm.$^2$.
Yield and tensile _____ 640 kg./cm.$^2$.
Elongation _____ 5.5 percent.
Tear _____ 25.
Folds _____ 30.
Heat distortion temperature _____ 203° C.

EXAMPLE 3

*Polycarbonate From 4,4'-Bis(Hyroxyphenyl)Methyl-3,4-Dichlorophenyl Methane*

Using the procedure of Example 1 the following materials were employed:

35.9 g. (0.1 mole) 4,4'-bis(hydroxyphenyl)methyl-3,4-dichlorophenyl methane
11.2 g. (0.28 mole) sodium hydroxide
10.9 g. (0.11 mole) phosgene in 50 ml. dry distilled methylene chloride
120 ml. distilled water
190 ml. distilled methylene chloride
1 ml. tri-n-butylamine The yield of white fibrous polycarbonate was 90 percent of the theoretical value and it had an inherent viscosity of 0.51 in chloroform.

A clear film cast from a methylene chloride solution of this polymer had the following physical properties:

Young's modulus _____ $3.7 \times 10^4$ kg./cm.$^2$.
Yield and tensile _____ 780 kg./cm$^2$.
Elongation _____ 6 percent.
Tear _____ 4.
Folds _____ 10.
Heat distortion temperature _____ 193° C.
Melting point _____ 197° C.

EXAMPLE 4

*Polycarbonate From 4,4'-Bis(Hydroxyphenyl)Methyl-2,5-Dichlorophenyl Methane*

Using the procedure of Example 1, the following materials were employed:

35.9 g. (0.1 mole) 4,4'-bis(hydroxyphenyl)methyl-2,5-dichlorophenyl methane
11.2 g. (0.28 mole) sodium hydroxide
10.9 g. (0.11 mole) phosgene in 50 ml. cold, dry distilled methylene chloride
100 ml. distilled water
100 ml. distilled methylene chloride
1 ml. tri-n-butylamine The yield of white, fibrous polycarbonate was 89.5 percent of the theoretical value, and it had an inherent viscosity of 0.52 in chloroform.

A clear film cast from a methylene chloride solution of this polymer had the following physical properties:

Young's modulus ............................. $3.4 \times 10^4$ kg./cm.$^2$.
Yield and tensile ............................. 440 kg./cm.$^2$.
Folds ............................................... 0.
Tear ................................................ 5.
Heat distortion temperature ............ 200° C.
Melting point .................................. 244° C.

It can be seen from the MIT folds values that these homopolymers are of minimal utility as regards flexibility in the case of the mono-chlorinated polymer and of little or no value as regards the dihalogenated homopolymers. The monohalogenated polymer of Example 2 is useful but it is expensive and does not lend itself to appreciable upgrading of bisphenol A polymers. Thus, a block copolymer of bisphenol A using the starting material of Example 2 as the modifier can be prepared as follows:

EXAMPLE 5

*Block Copolycarbonate From Bisphenol A and 4,4'-Bis-(Hydroxyphenyl)Methyl - 4 - Chlorophenyl Methane (75:25 Mole Percent)*

Using the procedure of Example 1, the following materials were employed to prepare the prepolymers:

Component A—
    59.0 g. (0.258 mole) bisphenol A
    28.8 g. (0.72 mole) sodium hydroxide
    28.2 g. (0.284 mole) phosgene in 50 ml. cold, dry distilled methylene chloride
    312 ml. distilled water
    258 ml. distilled methylene chloride
Component B—
    27.9 g. (0.086 mole) 4,4'-bis(hydroxyphenyl)methyl-4-chlorophenyl methane
    9.6 g. (0.23 mole) sodium hydroxide
    9.4 g. (0.95 mole) phosgene in 50 ml. cold, dry distilled methylene chloride
    105 ml. distilled water
    90 ml. distilled methylene chloride
Component C—
    0.5 ml. tri-n-butylamine The above components A and B were run separately and simultaneously, combined, tri-n-butylamine added, and allowed to polymerize. Polymerization time was about 3 minutes. The reaction was acidified with glacial acetic acid, washed free of water-soluble materials and the polymer precipitated from solution by pouring the viscous dope into several volumes of methyl alcohol.

The yield of white fibrous block copolycarbonate was 90 percent of the theoretical value, and it had an inherent viscosity of 2.23 in chloroform.

A clear film cast from a methylene chloride solution of this block copolycarbonate had the following physical properties:

Young's modulus ............................. $2.4 \times 10^4$ kg./cm.$^2$.
Yield and tensile ............................. 600 kg./cm.$^2$.
Elongation ...................................... 10 percent.
Tear ................................................ 50.
Folds .............................................. 130.
Heat distortion temperature ............ 189° C.

The following examples 6 and 7 show how other block copolymers can be prepared as described in Example 1. The fluorinated and chlorinated polymers are quite similar but the brominated and iodinated polymers are not considered equivalent.

EXAMPLE 6

*Block Copolycarbonate From 2-Phenyl-Bisphenol A and 4,4-Bis(Hydroxyphenyl)Methyl - 2,5 - Dichlorophenyl Methane (75:25 Mole Percent)*

Using the procedure of Example 1 the following materials were employed to prepare the prepolymers:

Component A—
    37.4 g. (0.129 mole) 2-phenyl-bisphenol A
    14.4 g. (0.36 mole) sodium hydroxide
    14.1 g. (1.42 mole) phosgene in 50 ml. dry, cold distilled methylene chloride
    185 ml. distilled water
    190 ml. distilled methylene chloride
Component B—
    15.4 g. (0.043 mole) 4,4'-bis(hydroxyphenyl)methyl-2,5-dichlorophenyl methane
    4.8 g. (0.12 mole) sodium hydroxide
    4.7 g. (0.047 mole) phosgene in 50 ml. dry, cold, distilled methylene chloride
    100 ml. distilled water
    100 ml. distilled methylene chloride
Component C—
    1 ml. tri-n-butylamine The above components A and B were run separately and simultaneously, combined, tri-n-butylamine added, and allowed to polymerize. Polymerization time was about 12 minutes. The reaction was acidified with glacial acetic acid. About 500 ml. of chloroform was added, the solution was washed free of water-soluble materials, and the polymer precipitated from solution by pouring the viscous dope into several volumes of methyl alcohol.

The yield of white fibrous polymer was 90 percent of the theoretical value and it had an inherent viscosity of 1.2 in chloroform.

A clear film cast from a methylene chloride solution of this block copolycarbonate had the following physical properties:

Young's modulus ............................. $3.0 \times 10^4$ kg./cm.$^2$.
Yield and tensile ............................. 765 kg./cm.$^2$.
Elongation ...................................... 7.5 percent.
Tear ................................................ 75.
Folds .............................................. 55.
Heat distortion temperature ............ 208° C.

EXAMPLE 7

*Block Copolycarbonate From 4,4'-Bis(Hydroxyphenyl)-Methyl Phenyl Methane and 4,4'-Bis(Hydroxyphenyl)-Methyl-3,4-Dichlorophenyl Methane (65:35 Mole Percent)*

Using the procedure of Example 1 the following materials were employed:

Component A—
    32.4 g. (0.112 mole) 4,4'-bis(hydroxyphenyl)methyl phenyl methane
    12.5 g. (0.297 mole) sodium hydroxide
    12.2 g. (0.123 mole) phosgene in 50 ml. cold, dry, distilled methylene chloride
    180 ml. distilled water
    180 ml. distilled methylene chloride
Component B—
    21.6 g. (0.06 mole) 4,4'-bis(hydroxyphenyl)methyl-3,4-dichlorophenyl methane
    6.7 g. (0.168 mole) sodium hydroxide
    5.9 g. (0.066 mole) phosgene in 50 ml. cold, dry, distilled methylene chloride
    120 ml. distilled water
    120 ml. distilled methylene chloride
Component C—
    1 ml. tri-n-butylamine The above components A and B were run separately and simultaneously, combined, tri-n-butylamine added, and allowed to polymerize. Polymerization time was about 5 minutes. The reaction was acidified with glacial acid, and 200 ml. additional methylene chloride was added. After washing free of water-soluble materials the polymer was precipitated from solution by pouring the viscous dope into several volumes of methyl alcohol.

The yield of white fibrous block copolycarbonate was 95 percent of the theoretical value, and it had an inherent viscosity of 1.58 in chloroform.

A clear fiber cast from a methylene chloride solution of this block copolycarbonate had the following physical properties:

Young's modulus _____ $3.1 \times 10^4$ kg./cm.$^2$.
Yield and Tensile _____ 765 kg./cm.$^2$.
Elongation _____ 7.1 percent.
Tear _____ 65.
Folds _____ 40.
Heat distortion temperature _____ 212° C.

Various polymers were prepared following the techniques described above using variations in the prescribed conditions and materials so as to obtain the data such as set forth in the following table. This data shows the value of various properties of solvent cast polycarbonate and comparative films approximately 0.005 inch thick. The values for the comparative films of cellulose triacetate and polystyrene are included in the table since their relationship to the improvement covered by this invention has been discussed hereinabove.

The preparation of film from these various polycarbonate polymers was generally accomplished using methylene chloride as the solvent in proportions such as 4 parts of solvent to 1 part of polymer or other suitable proportions to obtain a dope. The data was generally prepared by the machine coating technique employing a conventional coating machine having a dope hopper from which the dope is flowed onto a highly polished coating wheel from which it is stripped and cured as it passes through drying chambers. Of course, hand coating techniques can also be employed using apparatus wherein a coating knife with a vertically adjustable blade is used to manually spread the dope on a glass plate; the plate is put in an oven and dried for an extended period of time such as 18 hours at about 70° F. Although methylene chloride was generally employed, other solvents can also be used (e.g. other halogenated hydrocarbons) for the preparation of a solution or dope of the polymer so that it can be solvent cast or coated as described. Although the films tested in the table were not necessarily exactly 5 mils thick, the data set forth was adjusted accordingly so as to be properly comparable.

In this table the polycarbonates are considered as derived from bisphenols which are coded according to the following definition list:

| Bisphenol— | Code |
|---|---|
| 2,2-bis(4-hydroxyphenyl)propane | BPA |
| 2,2 - bis(3,5 - dichloro - 4 - hydroxyphenyl)propane | TCBPA |
| 4,4' - bis(hydroxyphenyl)methylphenylmethane | MPM |
| 4,4'-bis(hydroxyphenyl)methyl-4-chlorophenylmethane | M4CPM |
| 4,4' - bis(hydroxyphenyl)methyl - 3,4 - dichlorophenylmethane | M34CPM |
| 4,4' - bis(hydroxyphenyl)methyl - 2,5 - dichlorophenylmethane | M25CPM |
| 4,4' - bis(hydroxyphenyl) - 2,4 - dichlorophenylmethane | 24CPM |

PROPERTIES OF SOLVENT CAST POLYCARBONATE AND OTHER COMPARATIVE FILMS APPROXIMATELY 0.005 INCH THICK

| | Mole percent—See Definition List | | | | | | | Young's Modulus (10$^4$ kg./cm.) | | Flexibility (MIT Folds) | | Heat Softening or Distortion Temperature (° C.) | |
|---|---|---|---|---|---|---|---|---|---|---|---|---|---|
| | BPA | MPM | TCBPA | M4CPM | M34CPM | M25CPM | 24CPM | Random | Block | Random | Block | Random | Block |
| (a) | 100 | | 0 | | | | | 2.3 | | 148 | | 157 | |
| (b) | 80 | | 20 | | | | | 2.3 | | 62 | | 154 | |
| (c) | | 75 | | | 25 | | | | 3.0 | | 50 | | 210 |
| (d)[1] | 75 | | | | 25 | | | | [1] 2.6 | | [1] 90 | | [1] 198 |
| (e)[1] | 75 | | | [1] 25 | | | | | [1] 2.7 | | [1] 80 | | [1] 171 |
| (f) | 75 | | 25 | | | | | | 2.4 | | 85 | | 165 |
| (g) | 75 | | | 25 | | | | | 2.4 | | 130 | | 189 |
| (h) | 70 | | 30 | | | | | 2.3 | | 47 | | 150 | |
| (i) | 50 | | | | | 50 | | | 2.4 | | 20 | | 172 |
| (j) | 50 | | 50 | | | | | 2.9 | 3.0 | 18 | 30 | 159 | 140 |
| (k) | 30 | | 70 | | | | | 2.9 | | 10 | | 172 | |
| (l)[2] | 25 | | 75 | | | | | | [2] 3.0 | | [2] 70 | | [2] 220–240 |
| (m) | 20 | | 80 | | | | | 2.9 | | 13 | | 200 | |
| (n) | | 100 | | | | | | 2.9 | | 22 | | 184 | |
| (o) | 0 | | 100 | | | | | 3.0 | | 16 | | 220–240 | |
| (p) | | | | 100 | | | | 2.6 | | 30 | | 203 | |
| (q) | | | | | 100 | | | 3.7 | | 10 | | 193 | |
| (r) | | | | | | 100 | | 3.4 | | 0 | | >200 | |
| (s) | | | | | | | 100 | 2.8 | | 15 | | 187 | |
| Cellulose Triacetate | | | | | | | | 3.0–4.0 | | 25–35 | | 155 | |
| Polystyrene (oriented) | | | | | | | | 3.5 | | 50 | | 100 | |

[1] Covered by Laakso and Petropoulous application Serial No. 827,694
[2] Covered by Laakso and Buckley application Serial No. 815,694

The novel compounds contemplated by this invention have the following general formula:

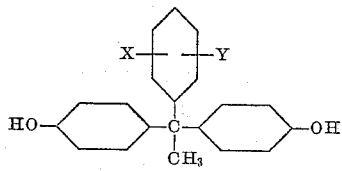

wherein each of X and Y represents a halogen atom selected from the group consisting of chlorine and fluorine atoms.

According to a more particular embodiment of this invention there is provided a compound melting at about 157°–159° C. having the following formula:

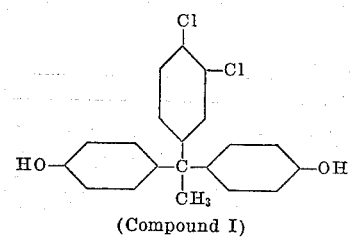

(Compound I)

According to another particular embodiment of this invention there is provided a compound melting at about 218°–220° C. having the following formula:

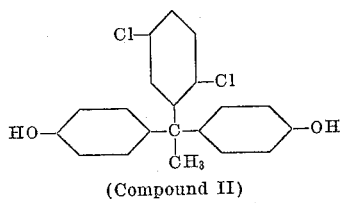

(Compound II)

These novel compounds can be prepared using the following general procedure: One mole of nuclearly dihalogenated acetophenone is dissolved in four moles of phenol. A trace of mercapto propionic acid is added and gaseous hydrogen chloride is bubbled into the reaction mixture at 20° to 60° C. until it is saturated. The reaction vessel is sealed and set aside at room temperature until the reaction is complete as evidenced by the reaction product crystallizing from solution. The reaction mixture is then steam distilled to remove most of the excess phenol and other volatiles. The residue is dissolved in diethyl ether and the ether solution is extracted with dilute sodium carbonate until the extracts are colorless. The produced bisphenol is extracted from the ether solution with dilute sodium hydroxide. The alkali solution is treated with decolorizing carbon and after filtration of the decolorizing carbon, the filtrate is carefully acidified with dilute hydrochloric acid. The crude bisphenol is filtered and crystallized from methylene chloride or other suitable solvent to obtain the pure product.

The following data was determined as to compounds I and II:

| Compound | Formula | ° C., M.P. | Elemental Analysis (%) | Ultraviolet |
|---|---|---|---|---|
| I | $C_{20}H_{16}O_2Cl_2$ | 157–159 | Theory C–66.9, H–4.5, Cl–19.75. Found C–67, H–4.7, Cl–19.4. | 275 m. (4,000). |
| II | $C_{20}H_{16}O_2Cl_2$ | 218–220 | Found C–67, H–4.6, Cl–19.7. | 229 m. (27,250) and 280 m. (3,740). |

The film supports for photographic purposes contemplated by this invention can be coated with black-and-white or color types of photographic emulsions so as to form a photographic element having unusually valuable properties. The coating of film bases with photographic emulsions is well known in the art and is described in numerous patents and publications such as in a paper by Trivelli and Smith, the Photographic Journal, vol. 79, pages 330–338, 1939. Emulsions such as those described by Trivelli et al. can be readily coated upon the surface of the film base encompassed by this invention using standard coating techniques.

Photographic elements were prepared by coating such an emulsion as described by Trivelli and Smith upon the film bases described in Examples 1 and 6.

In a container with temperature control was put a solution with the following composition:

(A) Potassium bromide _____ gm____ 165
    Potassium iodide _____ gm____ 5
    Gelatin _____ gm____ 65
    Water _____ cc____ 1700

And in another container was put a filtered solution consisting of:

(B) Silver nitrate _____ gm____ 200
    Water _____ cc____ 2000

Solution A was kept at a temperature of 70° C. during precipitation and ripening, while solution B was put in a separating funnel at a temperature of 70° C. The silver nitrate solution ran from the separating funnel through a calibrated nozzle into the container, the contents of which were kept in constant motion during precipitation and ripening, and, later, during finishing, by a mechanical stirrer.

After the precipitation, the emulsions were ripened for 20 minutes at the temperature of precipitation (70° C.). Then, they were cooled as quickly as possible to 45° C., and at this temperature 250 gm. of washed gelatin were added to each emulsion. The emulsions were stirred for 20 minutes at 45° C. in order to dissolve this gelatin. After standing overnight in a cold storage room, the emulsions were shredded and washed. They were then melted in the container at a temperature of 42° C. The weight of each of the emulsions was brought to 6.3 kg. (14 lbs.) by adding 100 gm. of gelatin soaked in the required amount of distilled water. Finishing was accomplished in 30 minutes, at a temperature of 60° C.

The photographic elements prepared as described were exposed to light and tested to determine their characteristics and found to behave satisfactorily in all regards and to have exceptionally advantageous properties at temperatures in excess of 150° C., a quite satisfactorily high degree of flexibility, and a Young's modulus of elasticity adequate for normal photographic purposes, especially when a suitable pelloid was applied to the back of the support. If desired the silver halide emulsion can be coated upon a subbing which is first applied to the film support and may be composed of a suitable gelatin composition or a terpolymer latex as described in the prior art, e.g. a latex of an acrylic ester, a vinyl or vinylidene halide and an unsaturated acid such as acrylic acid or itaconic acid, cf. U.S. 2,570,478. See also British Patent 808,629.

In the data presented herein the flexibility test was performed and the values recorded as to well cured film having a minimal retention of solvent since solvent retention in recently made film may give unrealistic values as to flexibility. The MIT folds test was performed using an MIT folding endurance tester made by Tinius Olsen; the technique employed is that originally designed some years ago for testing the flexibility of paper and now generally recognized as applicable to sheets of synthetic resins, viz ASTM Method D 643–43.

The block copolyesters as described are also useful as sheet packaging materials, adhesive tape bases, kinescope recording tape, dielectrics for condensers, etc. They have high melting points and are tough, elastic, tear resistant, resilient and are endowed with good electrical properties under various conditions including moist humid air in the tropics, air frictional heat in the nose cones of rockets or missiles, carbon arc motion picture projection, etc.

Although the invention has been described in considerable detail with reference to certain preferred embodiments thereof, it will be understood that variations and modifications can be effected without departing from the spirit and scope of the invention as described hereinabove and as defined in the appended claims.

As mentioned above, another application by Laakso and Petropoulos, Serial No. 827,694, covers block copolycarbonates of bisphenol A and 4,4′-bis(hydroxyphenyl) methyl-dihalophenylmethanes.

We claim:
1. An improved polycarbonate of 4,4′-bis(hydroxyphenyl)methylphenylmethane consisting of a highly polymeric block copolymer having an inherent viscosity of from about 0.4 to about 3.5 essentially composed of alternating blocks having the structures:
(I) Blocks characterized in that these blocks as an inde- pendent polymer would have an inherent viscosity of at least 0.05 measured in chloroform and be composed of from about 3 to about 50 recurring units having the following Formula A:

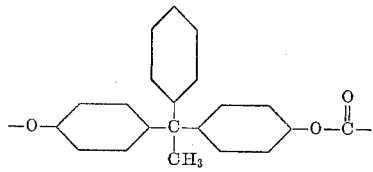

(II) Blocks characterized in that these blocks as an independent polymer would have an inherent viscosity of at least 0.05 measured in chloroform and be composed of about 3 to about 50 recurring units having the following Formula B:

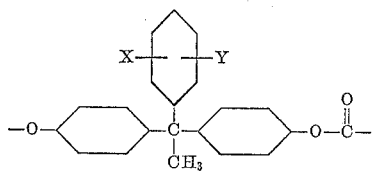

wherein each of X and Y represents a halogen atom selected from the group consisting of chlorine and fluorine atoms and wherein from about 60 to 85 mole percent of said block copolymer is composed of said units having Formula A, said block copolymer being characterized by having a heat softening temperature at least 10° higher than for the homopolymer of either of units of Formula A or Formula B and in the range of from about 200–230° C., having a Young's modulus of elasticity for film which is at least about 20% greater than for the homopolycarbonate of bisphenol A and at least about 28,000 kg./sq. cm., and having a flexibility measured by the MIT folds test at least about 3 times greater than for a homopolymer of units of Formula B and at least about 35.

2. An improved film of a polycarbonate as described in claim 1 wherein the units defined by Formula B have the following formula:

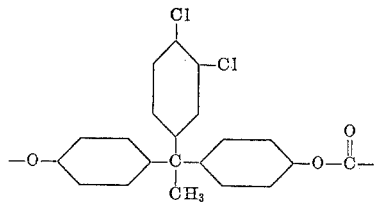

3. An improved film of a polycarbonate as described in claim 1 wherein the units defined by Formula B have the following formula:

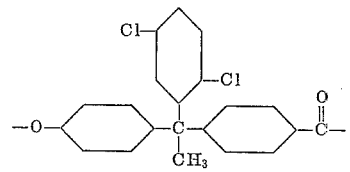

References Cited in the file of this patent
UNITED STATES PATENTS

| | | |
|---|---|---|
| 1,971,436 | Weiler | Aug. 28, 1934 |
| 2,669,588 | Deming et al. | Feb. 16, 1954 |
| 2,698,241 | Saner | Dec. 28, 1954 |
| 2,799,666 | Caldwell | July 16, 1957 |
| 2,843,567 | Williams et al. | July 15, 1958 |
| 2,874,046 | Klockgether et al. | Feb. 17, 1959 |
| 2,970,131 | Moyer | Jan. 31, 1961 |

OTHER REFERENCES

Schnell: Ind. Eng. Chem., 51, 157–160 (February 1959).